March 23, 1965     A. DREW     3,174,891
TAPING APPARATUS
Filed Sept. 12, 1962     6 Sheets-Sheet 1
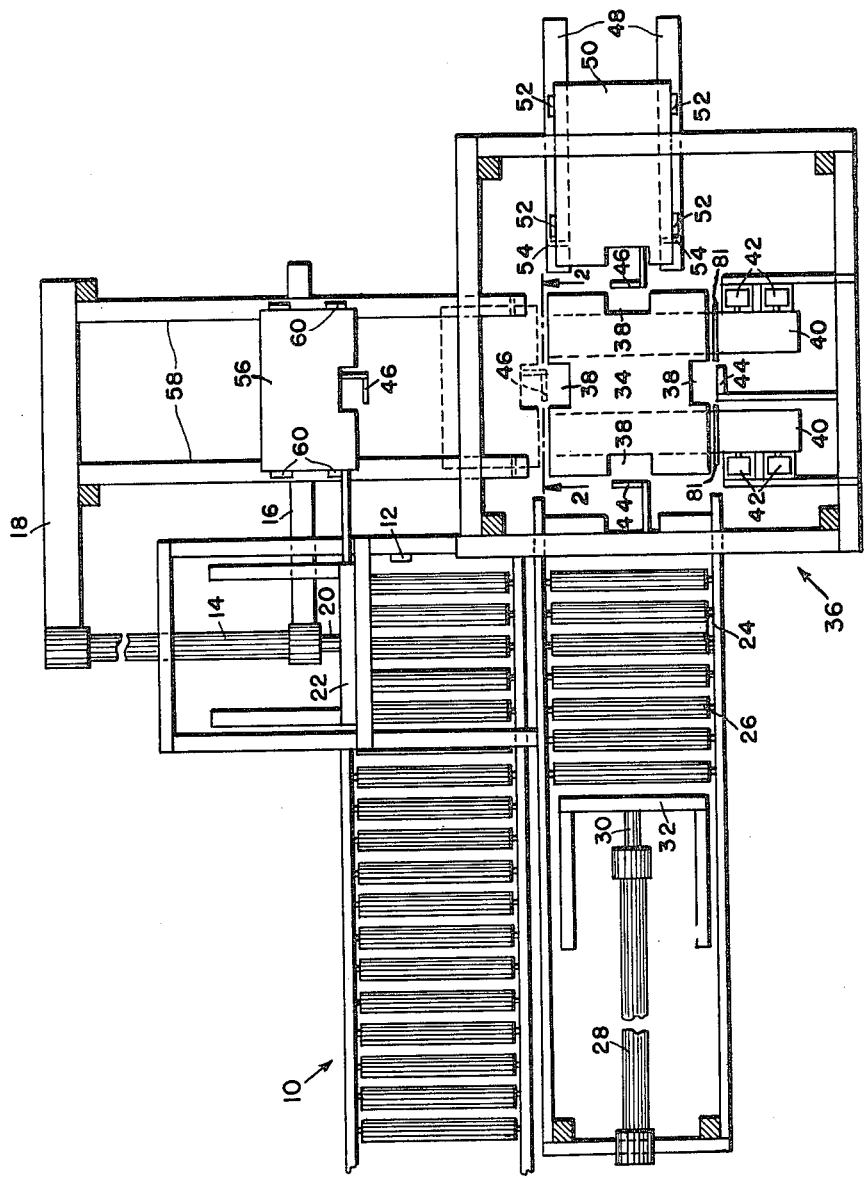
INVENTOR.
ADRIAN DREW
BY *H. J. Woodward*
                        *Atty.*

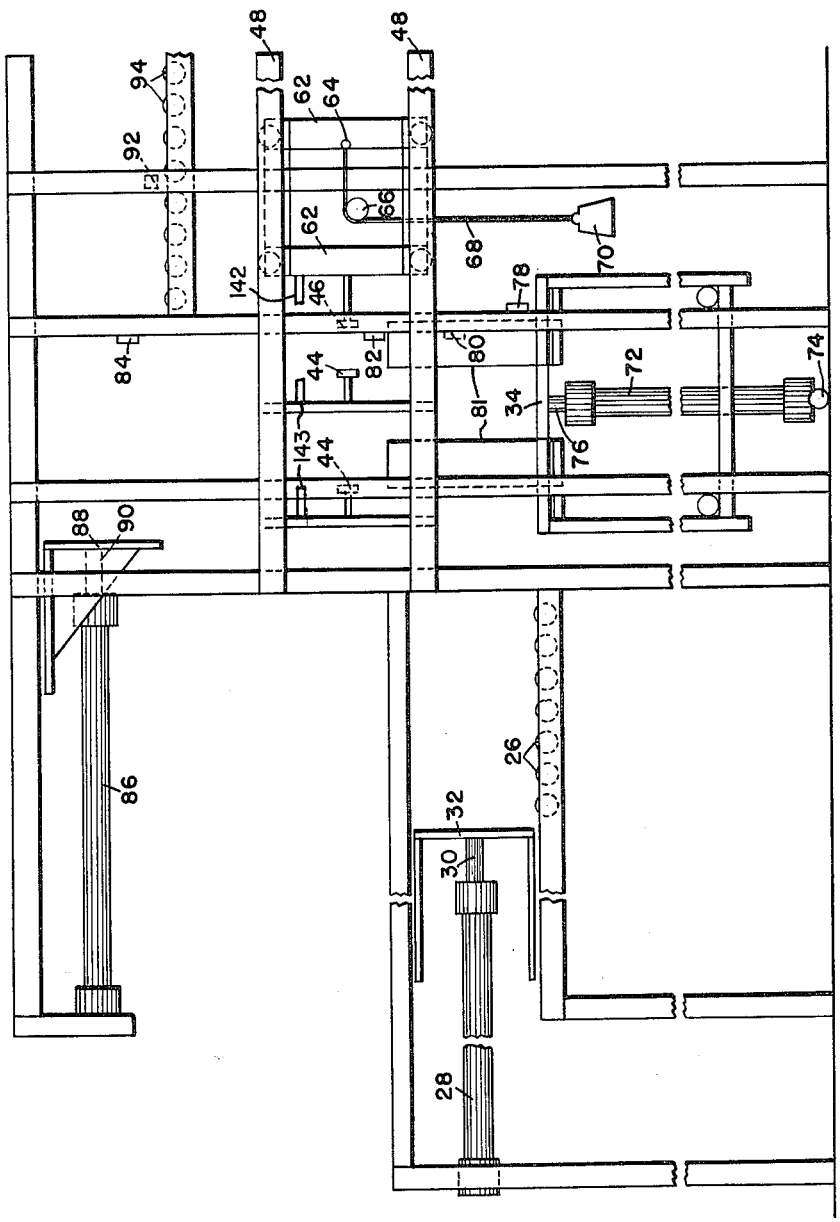

March 23, 1965  A. DREW  3,174,891
TAPING APPARATUS
Filed Sept. 12, 1962  6 Sheets-Sheet 3

INVENTOR.
ADRIAN DREW
BY H.J. Woodward
Atty.

March 23, 1965  A. DREW  3,174,891
TAPING APPARATUS
Filed Sept. 12, 1962  6 Sheets-Sheet 4

INVENTOR.
ADRIAN DREW
BY
H.J. Woodward
Atty.

March 23, 1965 A. DREW 3,174,891
TAPING APPARATUS
Filed Sept. 12, 1962 6 Sheets-Sheet 5

INVENTOR.
ADRIAN DREW
BY H. F. Woodward
Atty

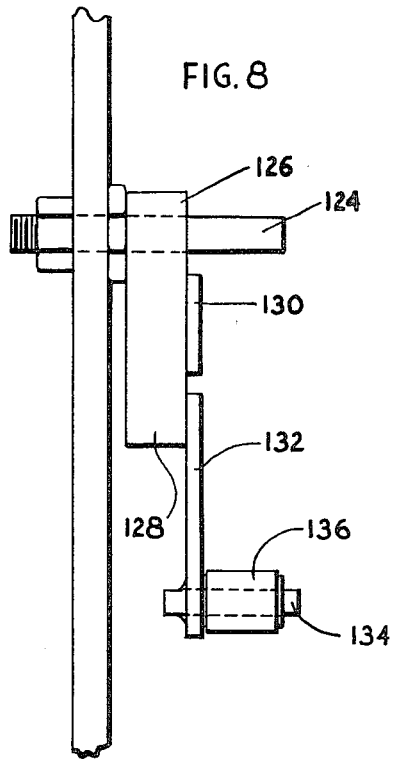
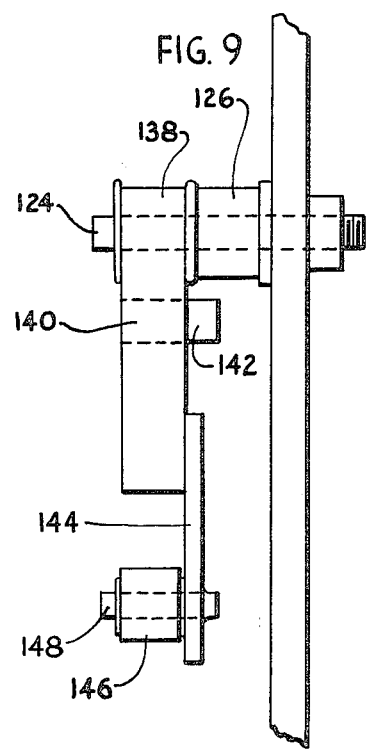
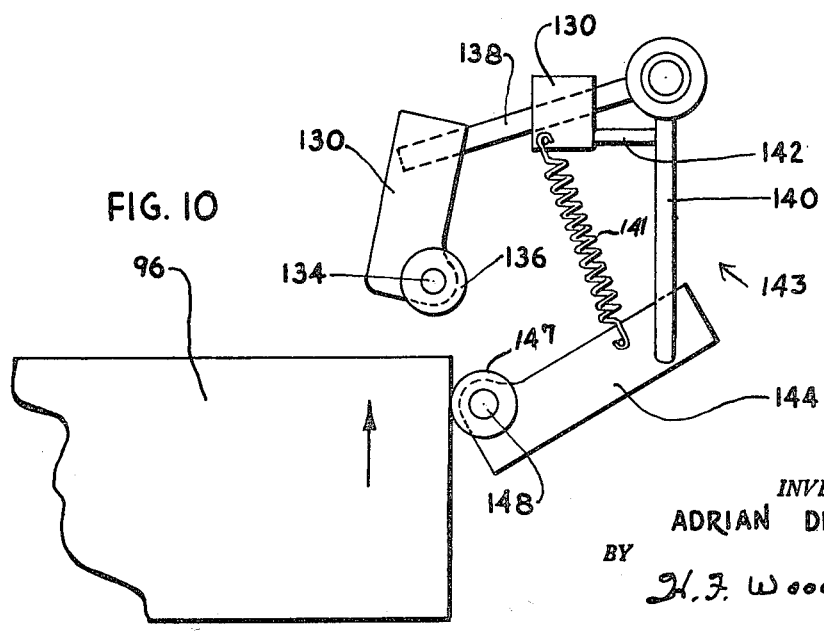

United States Patent Office 3,174,891
Patented Mar. 23, 1965

3,174,891
TAPING APPARATUS
Adrian Drew, 696 Linwood Ave., St. Paul, Minn.
Filed Sept. 12, 1962, Ser. No. 223,033
4 Claims. (Cl. 156—486)

The present invention relates to a machine for applying a normally tacky pressure sensitive adhesive tape to objects of varying sizes. It particularly relates to a taping machine of the type which acts to apply stripped material, such as adhesive tape, to cartons or boxes to seal them, and to strengthen them.

The invention particularly concerns the part that adjusts the tape applying mechanism to varying size packages continuously. The invention provides movement comprising a movable mounted tape applying means. A box sealing machine of the type to which this invention relates comprises a raising and lowering means for supporting a box to be sealed and movable taping mechanism which acts to move the taping mechanism to the proper position for different size containers.

For the purpose of this application there has been elected to set forth one particular structure but it is to be understood that they are here presented for illustrative purposes only and are not to be accorded any interpretation such as might have the effect of limting what is claimed in the invention short of its true and comprehensive scope in the art.

In the drawings:

FIGURE 1 is a top plan view of the box handling and taping device with parts broken away;

FIGURE 2 is a side elevation;

FIGURE 8 is a view of one wrap-around arm;

FIGURE 9 is a view of another wrap-around arm; and

FIGURE 10 is a side view of the assembled arms shown in FIGURES 8 and 9.

Figure 2A:
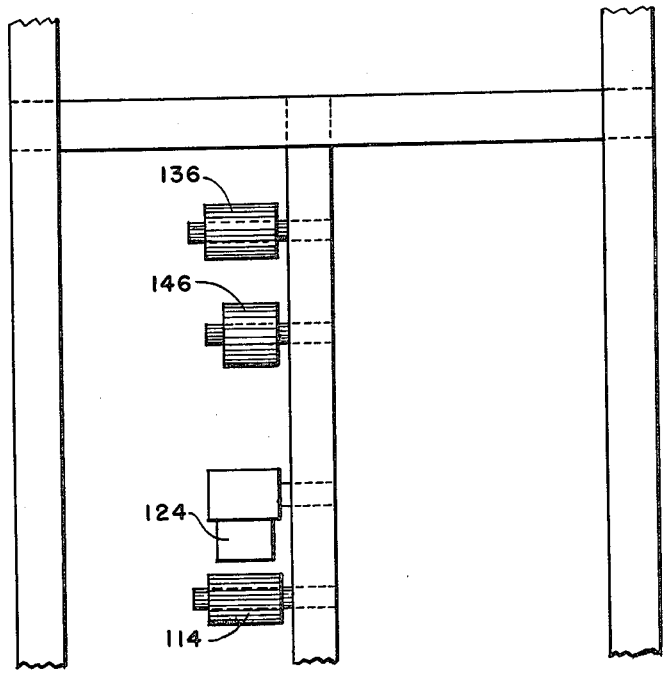
FIGURE 2A is a sectional view taken on line 2—2 of FIGURE 1.
Figure 4:
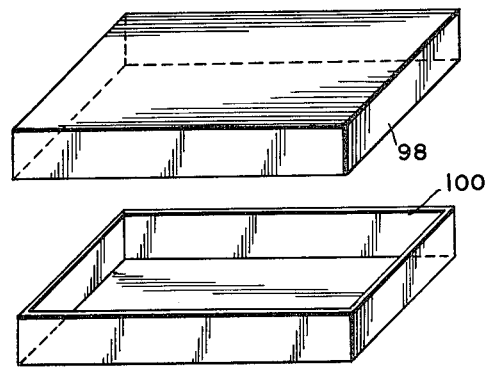
FIGURE 4 is a view of a box to be taped.

The construction and operation of the machine will first be described in general and then in detail. As shown in FIGURES 1 and 2 a machine embodying the present invention comprises conveyors, a frame generally indicated at 36 which supports box elevator 34, stationary taping heads 44 and movable taping heads 46. At the start of the operation box comprising bottom 100 into which the merchandise is deposited and the top 98 placed on the bottom. The box containing the merchandise is placed on a suitable conveyor which is carried thereby until it comes into contact with limit switch 12. The limit switch energizes air cylinder 14 which results in piston 20 being moved outwardly with the pusher end 22 mounted on piston 20 contacting the box and moving the box onto an adjacent conveyor. The adjacent conveyor may be of any suitable construction but roller conveyor 26 has proven very satisfactory. The box moving onto conveyor 26 comes into contact with limit switch 24. Closing of the limit switch 24 results in air cylinder 28 being energized. The energizing of air cylinder 28 causes piston 30 thereof to move outwardly. Pusher end 32 mounted on the piston 30 moves the box onto elevator 34. The box moving onto the elevator 34 comes into contact with limit switch 78. The closing of limit switch energizes air cylinder 72. Upon the energizing of controls for cylinder 72 the piston 76 carrying elevator 34 moves the box upwardly.

The upward travel of the box carried by elevator 34 contacts limit switch 80 which energizes taping heads controls 120. The opening of limit switch 80 de-energizes cylinder 28 which results in the piston returning to position shown in FIGURES 1 and 2. The upward travel of the box will have the top forced down on the box bottom by frictional contacts with the frame members such as 81.

The box or container has applied thereto tape 102 on opposite sides to secured top of box in closed position. The box then continues its upward travel and contacts limit switch 84. Limit switch upon being contacted by box energizes cylinder 86 causing the piston 90 to move outwardly. The piston push member 88 moves the box off the elevator 34 onto suitable discharge conveyor 94. As the taped box moves along the conveyor the box contacts limit switch 92. The limit switch being contacted results in air cylinder operating means being de-energized and thereby returning the piston to position shown in FIGURE 2. Also the limit switch 92 de-energizes cylinder control means for cylinders 14 and 72 and the pistons 20 and 76 return to position shown in FIGURES 1 and 2. When the elevator 34 returns to the lowered postion shown in FIGURES 1 and 2 it contacts limit switch 93. The apparatus is now in position to receive another container to be taped.

Figure 5:
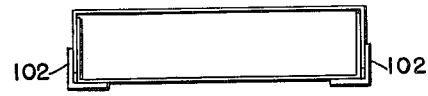
FIGURE 5 is a side view of a taped box.

The elevator 34 has opening 38 on opposed sides to permit the taping mechanism wrap-around arms to apply the tape to the bottom of the container as shown in FIGURE 5. Members 40 are attached to elevator 34 and at the ends of members 40 extends outwards from the elevator as shown in FIGURE 1. The outwardly extending ends have operatively attached thereto rollers 42 which assist in holding the elevator 34 in proper position during its upwardly and downwardly travel.

Taping mechanisms 44 are supported in a fixed position as shown in FIGURES 1 and 2. One of the taping heads 46 is mounted on movable mechanism including four spaced apart track members 48, carriage 50, rollers 52 supporting the carriage and riding upon track members 48, spacing bars 64. The carriage 50 is urged to the position shown in FIGURES 1 and 2 by suitable means, such as counter weight 70 carried by cable 68 which passes over pulley 66, the cable being attached to upright 62 of carriage 50. Suitable stop means 54 insures that the counter weight does not move the taping head supported by carriage toward the elevator 34 nearer predetermined positions as shown in FIGURES 1 and 2. Should the box to be taped be of greater size than the distance between opposite taping heads 44 and 46 the movable taping head is pushed outwardly by the box.

The other movable taping head 46 shown in FIGURE 1 in dotted line in taping position is operatively attached to air cylinder arrangement and moves inwardly and outwardly with the cylinder operating mechanism for cylinder 14. The movable carriage 56 is mounted on suitable rollers 60 which ride upon tracks 58. As the cylinder mechanism moves to push the box or container from the conveyor generally indicated at 10 to conveyor 26 the movable carriage 56 carrying taping head 46 to proper operating position.

Figure 7:
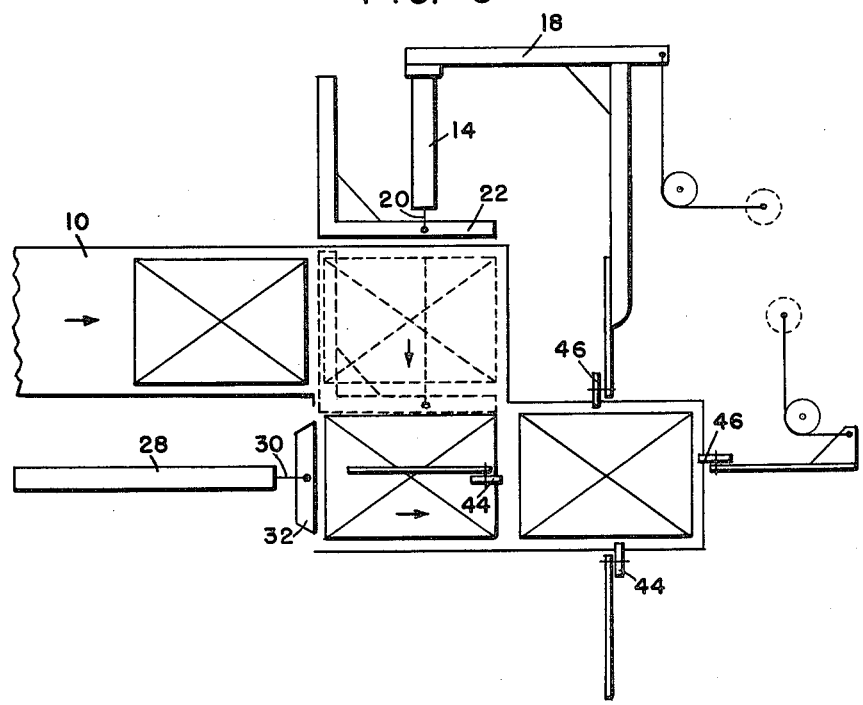
FIGURE 7 is a schematic plan view of a modified form of the box handling and taping mechanism.

Shown in FIGURE 7 is a modified arrangement for moving the movable taping heads to proper position depending upon the size of the box or container.

Figure 3:
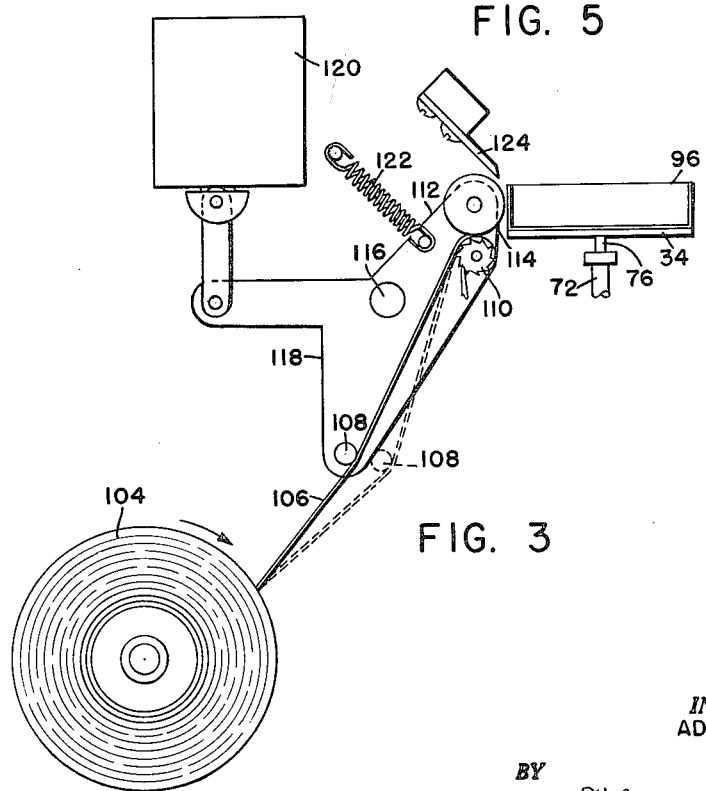
FIGURE 3 is a diagram of a tape applying machine.

Referring to FIGURE 3 showing a taping mechanism which includes an arm 112, pivoted about an axis 116, the arm has a first roller 114 rotatable mounted on the free end thereof. A one-way roller 110 is rotatable mounted on the arm in peripheral contact with the first roller 114. A roll of normally tacky pressure-sensitive adhesive tape 104 or its equivalent is mounted for rotation about a suitable axis at a point removed from the arm 112. The tape is led from the roll along the arm 112 and between the rollers 10 and 114 with the non-tacky side facing the roller 114 so that when trained around roller 114 it will be tacky side out for adherence to the surface of box 96.

A cutting means such as a knife 124 is positioned adjacent the applying station and beyond roller 114 in respect to the movement of box 96 in the upward direction of travel of elevator 34. The applying station is the region of the point of contact between roller 114 and the box 96. The free end of the arm 112 is impelled toward the applying station by a solenoid 120. It is impelled away from the applying station by a spring 122.

The box or container to be taped is moved upwardly past the tape applying means by the movement of the elevator 34. The opening of limit switch 80 de-energizes solenoid 120 and results in spring 122 moving the arm 112 to non-taping position. The box passes the taping stations on the elevator 34 and closes limit switch 82 which energizes solenoid 120 and brings roll 114 into contact with side of box 96, the movement of the box serving to withdraw tape from roll 104. As the box moves past the taping station the tape is brought against the cutting means and is thereby severed. The end of the tape adjacent the cut is then applied to the bottom of the box by the wrap-around arms. The arm remains in the applying position until the next box opens limit switch 80.

Upon contact of the roller 114 and the box with tape therebetween causes the tap 106 to be withdrawn from roll 104. To overcome the tendency of the tape tear when first contacting the box it is desirable to withdraw a short length of tape from roll 104 before applying the leading end to the box. To this end roller 110 may be equipped with a ratchet means which permits rotation of roll 110 only in one direction of the feed of the tape 106. In addition an idler roller 108 is rotatable and mounted on an extension 118 of the arm 112. The roller 108 is positioned so as to engage the span of the tape that extends from the supply roll 104 to the rollers 114 and 110 when spring 122 draws arm 112 away from the applying station. It is to be understood that any suitable cutting means may be used and the operating means for the cutter depends upon the type of tape.

There are four pairs of wrap-around arms such as shown in FIGURE 10. These arms are positioned above the taping heads 44 and 46 to assure the tape 106 is securely attached to the box. The wrap-around arms associated with the movable heads are carried by the head supports and move therewith. The wrap-around arms associated with the stationary taping heads are secured to the frame above the taping heads 44. There are four pair of wrap-around arms., The arms include pin 124 for supporting each pair of arms. Arm 128 is pivotally mounted on pin 124. Stop member 130 is secured to arm 128 and is adapted to co-operate with stop 142 carried by arm 140. Rigidly connected to arm 128 is arm member 130. Buffing roller 136 is rotatably mounted on shaft 134 carried by arm member 130. Also pivotally mounted on pin 124 is arm 140 which has attached thereto arm member 144. Arm member 144 at one end carries roller 147 rotatably mounted on shaft 148. Spring 141 urges the arms 138 and 140 toward each other and this movement is limited by stops 130 and 142.

Figure 6:
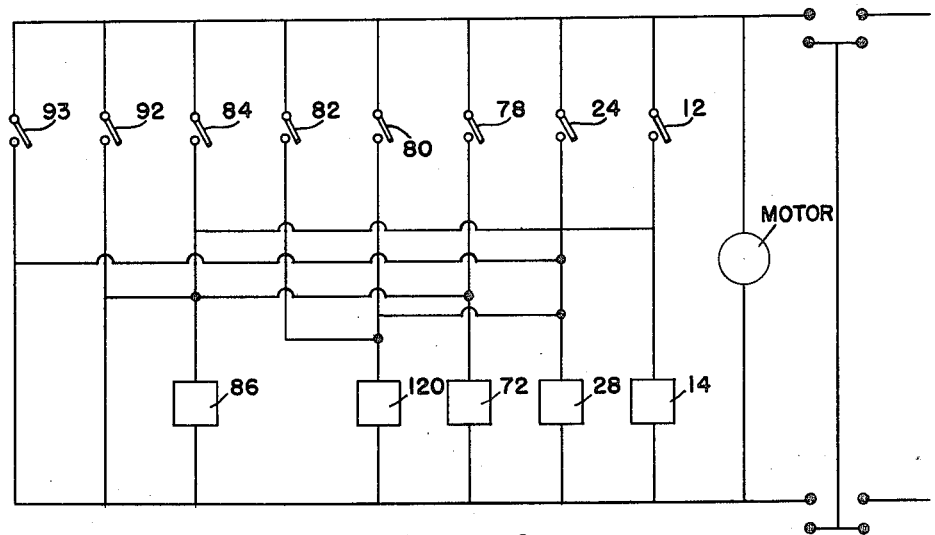
FIGURE 6 is a diagram of electrical control system for the box handling and taping mechanism.

It will be apparent from the foregoing general description that the several devices which act on the package during taping must be operated in a timed sequence. Such operation is obtained by an electrical control system which is illustrated schematically in FIGURE 6. The elements shown in FIGURE 6 are conventional limit switches and relays and act to energize or de-energize solenoids which solenoids operate valves controlling a supply of air to air cylinders which in turn act to operate parts of the machine. It should be understood that the machine incorporates suitable air supply lines from a reservoir (not shown) to operate the air cylinders.

What is claimed:

1. An apparatus for applying adhesive tape to cartons sides and bottom comprising a supporting frame, an elevator in the supporting structure for moving cartons vertically, said elevator having a carton receiving surface with substantially rectangular openings on opposed sides, four tape dispensers carried by said frame and adjacent the path of travel of the elevator, two adjacent tape dispensers movable, means for urging the said movable tape dispensers toward the path of travel of the elevator, four tape buffing means supported by the said frame and space vertically above the tape dispensers.

2. An apparatus for applying adhesive tape to sides and bottom of a carton, comprising a frame, an elevator mounted in said frame for vertical movement, a carton receiving floor in said elevator having substantially rectangular openings on opposed sides, four tape dispensing means supported by the frame adjacent the path of travel of the elevator, two of said tape dispensers movable, means for urging the movable dispensers toward the path of travel of the elevator and four pairs of tape buffing arms supported by the frame above the tape dispensers.

3. An apparatus for applying adhesive tape to sides and bottoms of a carton, a frame, an elevator vertically movable in said frame, a carton receiving floor in said elevator, said floor having openings in opposed sides, fixed and movable tape dispensers means attached to the frame adjacent the path of travel of the said elevator, a pair of tape buffing arms attached to said frame vertically above each tape dispensing means, each pair of said buffing arms pivoted attached to the frame and normally positioned less than 90 degrees apart but greater than 45 degrees apart, and spring means urging the arms toward each other.

4. The apparatus of claim 3 and means for pushing carton onto the elevator floor.

References Cited by the Examiner

UNITED STATES PATENTS

| | | | |
|---|---|---|---|
| 2,052,903 | 9/36 | Stagmeier | 156—468 |
| 2,512,579 | 6/50 | Long | 156—468 |
| 3,041,943 | 7/62 | Turner | 93—41 |

EARL M. BERGERT, *Primary Examiner.*